Sept. 17, 1940.    A. D. NASH    2,215,227

METHOD OF PRODUCING ORNAMENTAL GLASS TILE

Filed June 15, 1938

INVENTOR.
ARTHUR D. NASH
BY
ATTORNEYS.

Patented Sept. 17, 1940

2,215,227

UNITED STATES PATENT OFFICE 2,215,227

METHOD OF PRODUCING ORNAMENTAL GLASS TILE

Arthur D. Nash, Sewickley, Pa., assignor to Pittsburgh Plate Glass Company, a corporation of Pennsylvania Application June 15, 1938, Serial No. 213,790

4 Claims. (Cl. 49—82)

The invention relates to ornamental glass tile and a method of producing them, the present application constituting a continuation in part of my application, Serial No. 165,653, filed September 25, 1937. Glass tile can not be satisfactorily secured to a wall with Portland cement or plaster because of the poor adhesion between these materials and a smooth glass surface, such as that of commercially formed plate and window glass, but must be held by mastic or similar materials, which are relatively expensive. One object of my invention is to modify the surface structure of the glass plates, so that they are securely adherent to plaster, Portland cement or other inexpensive holding means of a similar character.

A further and most important object of the invention is to conduct the backing treatment, as above referred to, in such manner that the backing is utilized as a coloring layer for the plate or tile, the one operation serving not only to provide means for attaching the tile in position, but also to give it any desired color. The plates treated are, in this case, of clear glass, so that the backing layer shows from the front side of the plate or tile.

Figure 1:
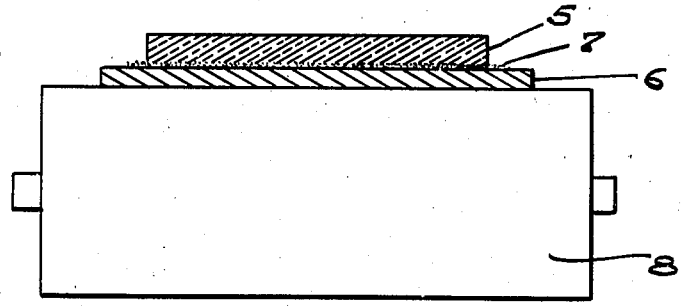
Figure 2:
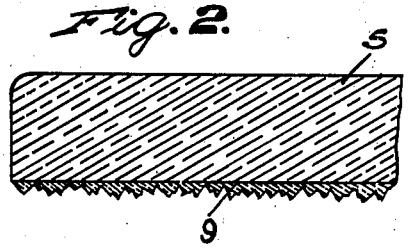
Figure 3:
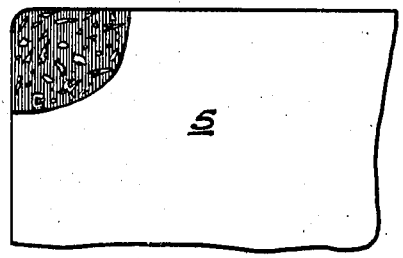
Figure 4:
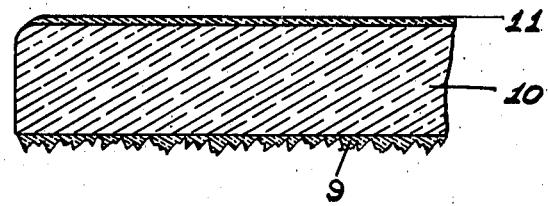

A still further object is the production of a cheap product, of unusual and attractive appearance, in which the colored layer has the same permanence and weathering qualities as the glass plate itself, so that the product may be used in outside work without fading or deterioration, such as occurs with the colored low-melting point glazes heretofore used. The invention is illustrated in the accompanying drawing, wherein:

Figure 1 is a section showing a plate in course of treatment. Fig. 2 is an enlarged section through a clear plate provided with the backing. Fig. 3 is a partial plan view looking at the face of the plate of Fig. 2. And Fig. 4 is a view similar to that of Fig. 2, in which the glass plate has a layer of colored enamel on its front face.

The plate 5 is of clear glass which has been cut from a large sheet of plate or window glass in the usual way by the use of a diamond or wheel. This plate is supported on a flat plate 6 of refractory material, such as clay, fused silica, carborundum or the like, with a thin layer 7 of finely divided material between the plates. This layer comprises preferably a mixture of about 50 per cent of fine sand and 50 per cent of crushed glass, preferably of a fineness such that the particles will pass a 20 mesh screen. The sand may be replaced by other finely divided material which is more refractory than the glass, such as crushed quartz, lime, carborundum or the like. The crushed glass may be of any desired color, if a colored tile is the objective. If not, it may be of ordinary plate, window or bottle glass.

The heat treatment involves carrying the assembly of Fig. 1 through a leer, preferably of the roller type (one of whose rolls 8 is shown), wherein the glass plate is raised during its progress therethrough to a temperature of about 1500 degrees F, and then carried through an annealing section where the temperature decreases gradually. The crushed glass in the layer 7 softens at about 1500 degrees F and the particles weld together and to the surface of the glass plate with which they contact. A small amount of the sand also welds to the glass plate and to the glass particles in the layer. This backing operation is accomplished without distorting the glass plate or injuring its polished upper surface. The glass plate is not welded to the plate 6 because most of the sand in the layer 7 does not fuse. After removing the glass plate from the leer, any loose sand in the layer 7 is easily removed with a wire brush.

The backing layer 9 (Fig. 2), as thus provided on the lower side of the glass plate, has a sharply roughened surface resembling coarse sandpaper, and is strongly adherent to ordinary plaster or Portland cement, so that the tile can be secured in position on a wall or ceiling without resorting to the use of mastic or other special holding compositions, such as are now regarded as essential in setting glass tile. The use of the sand mixed with the crushed glass is essential in producing the sharply roughened sandpaper surface, as without it, the crushed glass will melt down into a relatively smooth mat surface which has substantially no better adhesion to plaster than the untreated surface. The refractory sand particles act as spacers between the glass particles, providing recesses when they drop away and prevent the glass particles from melting down and smoothing out, as they would otherwise do, if used alone.

The plate, as viewed from the front, does not present a solid color, but has a somewhat speckled appearance, as indicated in Fig. 3. The light spots which show, are due to the sand, and while the plate viewed from a distance gives the impression of a solid color, the light spots add life and make the plates more attractive in appearance than tile having solid colors. In a broad way, the effect is somewhat similar to that present in the so-called "oatmeal" wall papers. The backing as thus produced is permanent in color, the fused glass having the same resistance to weathering as the material of the plate itself. No fluxing material is required in the backing to promote fusion, but a small amount may be used if desired. Any color of glass may be used in the backing, or a mixture of colors, and if the plate is one which merely requires a backing for holding purposes, such as is the case with the dense colored Carrara glasses, the crushed glass employed is ordinary clear glass. Viewed from the back of the plate, the layer 9 has a granular or pebbled appearance.

In quantity production, the glass plates are sent through the leer on closely spaced refractory plates, so that the process is a cheap and simple one comparable in cost to the ordinary annealing of glass articles by the continuous leer method.

In some cases, the glass plates are of composite character consisting of a layer 10 (Fig. 4) of clear plate or window glass with a layer 11 of colored glass thereon, such as produced by the process of my application, Serial No. 91,067, filed July 17, 1936, now U. S. Patent Number 2,177,000. When such layer 11 is rough, and has a mat character, the process, as heretofore described, not only applies the backing 9 of rough glass to give plaster adherence, but also smooths out the surface of the layer 11, so that it has the desired degree of fire finish. This result is due to the fact that the softening and welding of the crushed glass, and the flowing of the colored layer both occur at temperatures sufficiently close together to permit the two results to be accomplished at one time.

The proportions of materials in the layer 7 and the temperature of the leer, as given are the preferred ones, but it will be understood that some variation is permissible, depending on conditions and the particular composition of the glass plates. If the ratio of crushed colored glass to sand is increased, the color produced approaches more nearly to a solid one, while a decrease in such ratio will accentuate the speckled or mottled effect. A wide range of sand substitutes are available, and these may be utilized to modify the color effects, a dark colored refractory, such as carborundum, serving to shift the light effect of the sand to a darker shade. Sand and crushed quartz are preferred, however, because of their availability and cheapness. Metal plates of nickel chromium or other highly refractory composition may be used in place of the plates 6, as heretofore described, if desired, but in such case, the tendency of the crushed glass to weld to the metal plates must be guarded against by the use of a thin coating of finely divided flint clay or lime covering the metal surfaces.

What I claim is:

1. A process of treating a glass plate which consists in supporting it upon a flat refractory surface in horizontal position with a layer consisting of a mixture of finely crushed glass and finely divided material which is more refractory than the glass intermediate the plate and the refractory surface, subjecting the plate thus supported to a temperature at the softening point of the glass so that the particles of crushed glass in contact with the lower surface of the plate weld thereto without completely fusing, thus providing a sharply roughened coating layer, and then annealing the plate.

2. A process of treating a glass plate which consists in supporting it upon a flat refractory surface in horizontal position with a layer consisting of a mixture of finely crushed glass and sand intermediate the plate and the refractory surface subjecting the plate thus supported to a temperature at the softening point of the glass so that the particles of crushed glass and some of the sand in contact with the lower surface of the plate weld thereto without completely fusing, thus providing a sharply roughened coating layer, and then annealing the plate.

3. A process of treating a plate of clear glass which consists in supporting it upon a flat refractory surface in horizontal position with a layer consisting of a mixture of finely crushed colored glass and finely divided material which is more refractory than the glass intermediate the plate and the refractory surface, subjecting the plate thus supported to a temperature at the softening point of the glass so that the particles of crushed glass in contact with the lower surface of the plate weld thereto without complete fusing, thus providing a sharply roughened colored coating layer, and then annealing the glass.

4. A process of treating a plate of clear glass having fused thereon a layer of colored glass having a mat surface which consists in supporting the plate in horizontal position upon a flat refractory surface with a layer consisting of a mixture of crushed glass and finely divided material which is more refractory than the glass interposed between the refractory surface and the plate, subjecting the assembly to a temperature at the softening point of the glass so that the particles of crushed glass in contact with the lower surface of the plate weld thereto without complete fusing so as to give a rough surface and the mat surface of the colored glass smooths out, and then annealing the plate.

ARTHUR D. NASH.